United States Patent Office 3,067,118
Patented Dec. 4, 1962

3,067,118
METHOD OF MAKING UNIFORM DISPERSIONS
OF CARBON BLACK IN POLYOLEFINS
Billy G. Harper and Jack R. Davis, Lake Jackson, Tex.,
assignors to The Dow Chemical Company, Midland,
Mich., a corporation of Delaware
No Drawing. Filed Jan. 23, 1961, Ser. No. 83,939
9 Claims. (Cl. 204—162)

This invention relates to methods for making mixtures of carbon black in polyolefins. More particularly, it relates to methods for obtaining uniform dispersions of carbon black in polyolefins.

It is known that solid polymers of olefins are especially useful materials which can be made into films, fibers and other shaped articles, coatings and adhesives. These polymers are fairly resistant to degradation caused by various external factors. It has been found that the admixture of carbon black with these polymers increases their resistance to degradation, especially degradation caused by oxidation, heat, light, and weathering. The admixture of carbon black with polyolefins also increases their resistance to flow and to distortion caused by heat.

It is among the objects of the present invention to provide a new and improved method for the preparation of compositions comprising solid polymers of olefins and carbon blacks.

A further object of the present invention is the provision of a method by which dispersions of carbon black in olefin polymers can be made more uniform.

Another object of the present invention is the provision of a convenient and economical method for the production of highly uniform, intimate admixtures of olefin polymers with carbon black.

The above and other objects and advantages are obtained in accordance with the practice of the present invention.

It is found that the resistance of polyolefin-carbon black mixtures to degradation by heat, light, oxidation and weathering is a direct function of the degree of uniformity and intimacy of dispersion of the carbon black in the polymer. In accordance with the present invention an especially uniform and intimate dispersion of carbon black in polyolefins is obtained by subjecting the polymer to ultraviolet radiation prior to its admixture with the carbon black. After the polymer is subjected to the ultraviolet radiation treatment, it is then blended with the carbon black to form highly homogeneous intimate dispersions.

The polymers useful in the process of the present invention are synthetic resins made by polymerizing non-aromatic hydrocarbon mono-olefins having from 2 to 6 carbon atoms. Representative examples of such polymers are polyethylene, polypropylene, copolymers of ethylene and propylene, copolymers of propylene and 1-butene, and so forth, having molecular weights of 2000 and upwards to 150,000 or more. Such polymers can be made by high or low pressure polymerization process as is known to the art and can contain in polymerized form small amounts of other mono-ethylenically unsaturated comonomers. It is preferred to use those polymers having molecular weights between about 10,000 and 50,000. The molecular weights referred to herein are obtained by measurement of solution viscosity according to the method of Fikentscher.

Ordinary carbon blacks including channel blacks, lamp blacks, furnace blacks, and acetylene black having particle sizes between about 50 and 5000 Angstrom units are suitable for use in this invention. It is preferred, however, for purposes of the present invention to use carbon blacks having an average particle size of between 50 and 250 A. since such blacks impart to the product the maximum resistance to degradation of the polymer.

The ultraviolet radiation suitable for use in treating polyolefins in the process of the present invention can be obtained from any of various commercially available electrically energized ultraviolet lamps having spectra between 130 and 3900 A.

The compositions produced according to the method of the present invention can contain as small an amount as ½ percent to as much as 50 percent carbon black. Such compositions can be made by milling the desired amount of carbon black into the polymer in a single mixing step after the polymer has been irradiated. For compositions containing percentages in the lower end of the above mentioned range, for example, from 1 to 5 percent carbon black, it is preferred to make a concentrate of carbon black in irradiated polymer and then to cut or extend the concentrate with additional polymer. The polymer used to extend the concentrate need not be of the same molecular weight, or made by the same process or from the same olefin monomer as the polymer that is used to make the concentrate. The extending polymer can be irradiated prior to admixture with the concentrate, but such irradiation is not essential to the present invention. After forming a composition of the present invention into a shape in which it will ultimately be used, the shaped article can be irradiated to further improve its chemical and physical properties, if desired.

In carrying the invention into practical effect, the solid polymers or copolymers or mixtures thereof can be mixed with the carbon black on a roll mill or an internal mixer such as a Banbury mixer or a mixing extruder.

In the following examples, which are illustrative of this invention, parts and percentages are parts and percentages by weight unless otherwise indicated.

Example I

A sample of 975 parts of polyethylene pellets, ¼ inch in diameter and ⅜ inch in length is divided into two portions, one of 75 parts and the other of 900 parts. The polyethylene has an average molecular weight of 24,600 (determined according to Fikentscher using a 0.1 percent solution in decahydronaphthalene at 135° C.). The 75 parts are placed in a feed hopper and by means of a vibrator, operatively connected to the hopper, the pellets are spread out one deep on a moving conveyor belt. A Hanovia Model LL 1200 watt mercury vapor lamp with a reflector is spaced six inches above the belt. The pellets are carried by the belt under the lamp and through the ultraviolet radiation. The belt speed is adjusted so that the pellets are subjected to light from the ultraviolet lamp for 1.0 second. The thus irradiated polymer is then admixed with 25 parts of carbon black having an average particle diameter of 180 A. for 45 minutes in a size "B" Banbury mixer heated to a temperature of 160° C. to form 100 parts of a concentrate. The concentrate is passed through an extruder and repelletized. The pelletized concentrate is dry-blended in a rotating drum with an extending medium comprising the 900 parts of untreated polyethylene pellets above referred to and the blend is put through a screw extruder. The black product is a uniform blend containing 97½ percent polyethylene and 2½ percent carbon black in intimate admixture.

In order to determine the quality of the dispersion of the carbon black in the polyethylene, the following procedure is employed: A 0.002 gram sample of the dispersion is placed on a clean, standard microscope slide (75 mm. x 25 mm.). A second standard microscope slide is placed on top of the sample forming a sandwich of the two slides with the sample to be tested between the slides. The sandwich is placed in a slide holder on a hot plate whose temperature has previously been adjusted to 275° C. A 1600 gram weight is placed on top of the sandwich. The sample softens and flows outwardly to form a roughly circular film approximately ½ inch in diameter and having a thickness of about 0.001 inch. The specimen is placed on one stage of a 100 power comparison microscope using a 100 watt daylight bulb as a substage source of illumination. A series of 10 standard slides, having varying degrees of uniformity of dispersion of mixtures of carbon black in polymer is used to determine the uniformity of dispersion of the carbon black in the specimen. The slides are numbered from 1 to 10, the slide numbered 1 having the most uniformly dispersed mixture of carbon black in polymer and each successively higher numbered slide having a less uniformly dispersed admixture of carbon black in polymer than the adjacent lower numbered slide. The specimen is compared at a magnification of 100 diameters with the standard slides and is given a numerical dispersion rating corresponding to the number of the standard slide it most closely resembles. When a specimen has a dispersion intermediate adjacent standard numbers, it is given a rating of ½ plus the number of the lower numbered standard. The polymer-carbon black mixture obtained in Example I has a dispersion rating of 8.

By contrast, a specimen made in accordance with the procedure of Example I, except that the irradiation step is omitted, has a dispersion rating of greater than 8.

*Examples II Through VII*

The procedure of Example I is repeated using the same materials and proportions except that the time of irradiation is increased as indicated in Table I along with the results obtained.

TABLE I

| Example | Irradiation Time (Seconds) | Dispersion Rating |
|---|---|---|
| II | 2.5 | 3 |
| III | 5.0 | 2 |
| IV | 7.5 | 2 |
| V | 10.0 | 1 |
| VI | 15.0 | 1 |
| VII | 30.0 | 4 |

*Examples VIII Through XIV*

The procedure followed in Examples I through VII is repeated except that a polyethylene having a molecular weight of 42,400 is used. The irradiation times and dispersion ratings are given in Table II.

TABLE II

| Example | Irradiation Time (Seconds) | Dispersion Rating |
|---|---|---|
| Control | 0. | >7 |
| VIII | 1.0 | 7 |
| IX | 2.5 | 5 |
| X | 5.0 | 3 |
| XI | 7.5 | 3 |
| XII | 10.0 | 2 |
| XIII | 15.0 | 1 |
| XIV | 30.0 | 3 |

*Example XV*

Three pounds of polyethylene pellets, having a molecular weight of 42,400 (as determined by viscosity measurements according to Fikentscher), is placed in an open pan at a distance of about 6 inches from an ultraviolet source. The source is a General Electric Model A-H4 mercury vapor lamp, modified by removing the glass bulb and replacing it with a quartz tube. Characteristics of this lamp are: 100 watts, 130 volts, total radiated energy of wave lengths of from 2800 to 3800 A. is 5 watts. The pan is placed on a conveyor which moves the pan back and forth under the lamp. The pellets are stirred every 10 to 15 minutes to obtain uniform radiation throughout the batch. The total length of time of radiation is 4 hours. At the end of this time the entire batch is mixed with 1 pound of carbon black, having an average particle size of 180 A., in a Banbury mixer heated to about 160° C. to form 4 pounds of black polyethylene concentrate containing 25 percent by weight of carbon. One pound of this concentrate is mixed in a Banbury mixer maintained at a temperature of 160° C. with 9 pounds of unirradiated polyethylene pellets (molecular weight, 42,400) to produce a polymer of uniform blend containing about 2.5 percent by weight carbon black. The polyethylene-carbon black blend is tested in the manner described in Example I and is found to have a rating of 2. By contrast, a polyethylene-carbon black blend made in accordance with this example, except that the irradiation treatment is omitted, has a dispersion rating of 7½.

*Example XVI*

In a manner similar to Example XV, polyethylene having a molecular weight of 46,000 is irradiated with ultraviolet light from a G.E. Model A-H4 mercury vapor lamp modified as above for a total time of 15 minutes in an open pan with stirring at 5 minute intervals. The irradiated polymer is mixed with carbon black and extended as in Example XV. The dispersion rating of this product is 4. By contrast, when the irradiation treatment is omitted, a dispersion rating of 8½ is obtained.

In a manner similar to the foregoing examples polypropylene is subjected to ultraviolet radiation and then mixed with carbon black, and a copolymer of ethylene and propylene is subjected to ultraviolet radiation and then mixed with carbon black, each producing dispersions of improved uniformity similar to those obtained in the foregoing examples.

As can be seen from the foregoing, small amounts of artificial ultraviolet radiation improve the uniformity and intimacy with which carbon black disperses in normally solid olefin polymers and copolymers. The duration of the treatment can be varied over a considerable range, and can be varied in accordance with the intensity of radiation emitted by the source and the distance of the source from the polymer.

When desired, compositions made in accordance with the present invention can contain additives in addition to carbon black, such as plasticizers, antioxidants, fillers and resinous materials other than polyolefins. The compositions produced by the present invention can be fabricated by known techniques into films, fibers, containers, toys, coatings, wire coverings, laminates and a myriad of other useful articles.

That which is claimed is:

1. A process for the production of an intimate dispersion of carbon black in a normally solid polymer of a lower nonaromatic hydrocarbon mono-olefin having from 2 to 6 carbon atoms which comprises subjecting the polymer to ultraviolet radiation and subsequently admixing carbon black therewith.

2. A process according to claim 1 in which the polymer is polyethylene.

3. A process according to claim 1 in which the polymer is polypropylene.

4. A process according to claim 1 in which the polymer is a copolymer of ethylene and propylene.

5. A process according to claim 1 in which the carbon black particles have an average diameter of between 50 and 250 Angstrom units.

6. A process according to claim 1 which comprises the further step of mixing additional olefin polymer with the product of claim 1 to extend the dispersion.

7. A process for the production of an intimate mixture of carbon black having an average particle size of from 50 to 250 Angstrom units with a synthetic resin which comprises subjecting the resin to ultraviolet radiation, mixing the so-treated resin with the carbon black to form a concentrate and mixing the concentrate with additional resin to produce a substantially homogeneous extended dispersion of carbon black in the resin, the resin being selected from the group consisting of polyethylene, polypropylene, copolymers of ethylene and propylene, and mixtures thereof.

8. A process according to claim 7 in which the concentrate contains about 25 percent by weight of carbon black and the extended dispersion contains about 2½ percent by weight of carbon black.

9. A method for making improved dispersions of carbon black in a normally solid polymer of a lower non-aromatic hydrocarbon mono-olefin having from 2 to 6 carbon atoms which comprises irradiating the polymer with ultraviolet light and thereafter milling carbon black with the irradiated polymer to form a uniform dispersion of carbon black in the polymer.

References Cited in the file of this patent

UNITED STATES PATENTS 2,888,424      Precopio et al. _____ May 26, 1959